Patent Number: 4,630,859
Date of Patent: Dec. 23, 1986

[54] WIND DEFLECTOR ARRANGEMENT FOR A MOTOR VEHICLE ROOF

[75] Inventors: Horst Bienert, Gauting; Georg Kohlpaintner, Martinsried, both of Fed. Rep. of Germany

[73] Assignee: Webasto-Werk W. Baier GmbH & Co., Fed. Rep. of Germany

[21] Appl. No.: 721,907

[22] Filed: Apr. 10, 1985

[30] Foreign Application Priority Data

Apr. 25, 1984 [DE] Fed. Rep. of Germany ....... 3415361

[51] Int. Cl.⁴ .............................................. B60J 7/22
[52] U.S. Cl. ..................................... 296/217; 296/91
[58] Field of Search ................ 296/217, 221, 222, 91, 296/95 R, 216; 98/2.12, 2.14

[56] References Cited

U.S. PATENT DOCUMENTS

| | | | |
|---|---|---|---|
| 2,681,700 | 6/1954 | Krusemark | 296/95 R |
| 3,203,727 | 8/1965 | Werner | 296/91 |
| 3,560,044 | 2/1971 | Helm | 296/91 |
| 3,596,975 | 8/1971 | Stephen | 296/91 |
| 3,727,973 | 4/1973 | Perks | 296/217 |
| 4,081,194 | 3/1978 | Jardin | 296/1 S |
| 4,142,759 | 3/1979 | Bienert | 296/217 |
| 4,268,085 | 5/1981 | Sakai | 296/217 |
| 4,296,962 | 10/1981 | Jardin et al. | 296/217 |
| 4,482,183 | 11/1984 | Grimm et al. | 296/217 |

FOREIGN PATENT DOCUMENTS

| | | | |
|---|---|---|---|
| 3046399 | 7/1982 | Fed. Rep. of Germany | 296/222 |
| 3137191 | 3/1983 | Fed. Rep. of Germany | |
| 7906876 | 3/1981 | Netherlands | 296/217 |

Primary Examiner—Robert B. Reeves
Assistant Examiner—Dennis H. Pedder
Attorney, Agent, or Firm—Sixbey, Friedman & Leedom

[57] ABSTRACT

A wind deflector arrangement for a motor vehicle roof having a roof opening that can be closed by means of a sliding cover. The wind deflector can be pivoted around an axis extending transversely to the longitudinal axis of the vehicle along the front edge of the roof opening. The wind deflector has a body which, when the sliding cover is opened is swung out by spring power, and, when the sliding cover is closed, is swung in by a cam that is displaced as a function of the movement of the cover and which interacts with at least one lever arm that is connected with the wind deflector via a driving arrangement. The body of the wind deflector, at least partly, consists of an as extruded, extruded profiled part, the end edges of which are covered by attachment to the body of a respective end piece that, at the same time, is part of the driving arrangement connecting the lever arm with the wind deflector.

21 Claims, 12 Drawing Figures

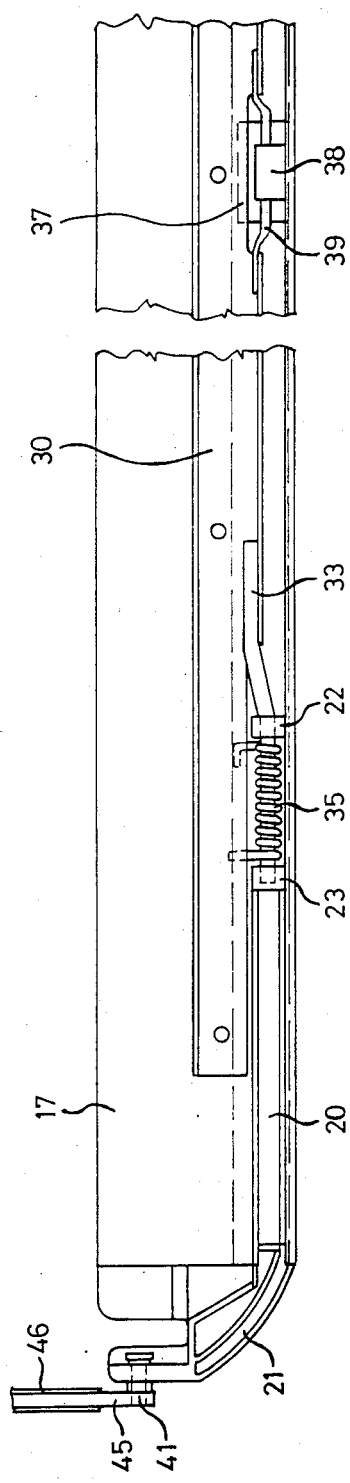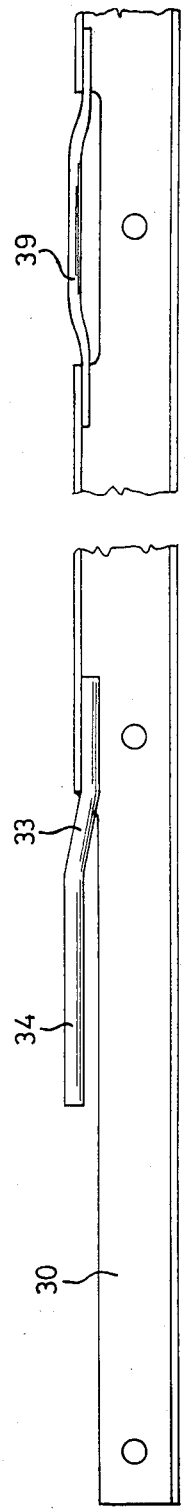
FIG. 7
FIG. 8

WIND DEFLECTOR ARRANGEMENT FOR A MOTOR VEHICLE ROOF

BACKGROUND AND SUMMARY OF THE INVENTION

The invention relates to a wind deflector arrangement for a motor vehicle roof having a roof opening that can be closed by means of a sliding cover and having a wind deflector that is arranged along the front edge of the roof opening and can be pivoted around an axis located transversely to the longitudinal axis of the vehicle, said wind deflector having a body that can be swung out by spring power when the sliding cover is opened and can be swung in when the sliding cover is closed by a cam that is displaced along with movement of the cover and runs against at least one lever arm that is drivingly connected to the body of the wind deflector.

In the case of the known wind deflector arrangements of this type, the wind deflector body consists of a sheet steel stamping (U.S. Pat. No. 4,081,194), of a sheet steel stamping with molded plastic parts for the connection of the swivel arms, inserted at distances from the lateral edges (German Offenlegungsschrift No. 31 37 191), of a molded plastic part (U.S. Pat. No. 4,268,085) or of a molded sheet-metal part having a molded plastic part placed onto it in order to achieve the desired wall thickness (U.S. Pat. No. 4,296,962). The known solutions have incommon that the manufacturing of the wind deflector body is relatively costly and especially requires expensive tools which as a rule have to be newly procured for each car model because of the varying dimensions of the wind deflector.

It is a primary objective of the wind deflector arrangement in accordance with the present invention to provide a wind deflector arrangement that permits a less costly manufacturing of the wind deflector arrangement even when the body of the wind deflector must have a relatively large thickness in view of favorable flow conditions.

According to preferred embodiments of the invention, this objective is achieved by the fact that the body of the wind deflector consists at least partly of an unfinished profiled part, each lateral edge of which is covered by a respective end piece that, at the same time, forms a part of the wind deflector driving arrangement.

By means of this development, it is achieved that the wind deflector body, at least partly, is formed of sections of an appropriate length of a profiled part that can be furnished as running length stock (such as indefinite length extruded strips).

The manufacturing of profiled parts of this type is not very costly. Profiled parts, in a simple way, permit an adaptation to wind deflector widths that differ from one vehicle model to the next because only the length of the section must be changed. Any profile that may be desired on the basis of flow conditions can be produced at minimal cost. The end pieces cover the normally unsightly lateral edges of the profiled part and thus form a pleasant lateral end. Since the end pieces also represent a part of the driving arrangement and, for example, have actuating grooves into which a driving pin at the free end of the swivel arm engages, the manufacturing costs on the whole are reduced further.

In a further development of the invention, the wind deflector body may advantageously consist of an extruded profile of a light metal, such as aluminum. The wind deflector body may also be composed of a light-metal extruded profiled part and an additional component made of plastic or rubber extending in the longitudinal direction of the wind deflector. This latter component may advantageously also be a profiled part.

In the interest of a simple and robust connection between the end pieces and the profiled part, the end pieces preferably carry projections that extend laterally toward the inside and are slid into a complementary recess of the profiled part. In accordance with another aspect of the invention, bearing points for stationary lateral hinge shafts are also provided at the projections of the end pieces around which the wind deflector can be swivelled. In this manner, the assembly is simplified further. For the fastening of the wind deflector body, it is advantageous to provide a cover rail that can be mounted at a component that is fixed at the roof and may, for example, be screwed to the latter. The hinge shafts are advantageously fastened at the cover rail. An especially compact wind deflector installation unit is obtained when, at each of the two end piece projections, two bearing points are shaped onto said projections that are spaced away from one another in the direction of the shafts of the hinges and when, in each case, between the two bearing points, a torsion spring is fitted on the hinge shafts which on one side supports itself at the wind deflector body or the end piece projection and on the other side at the cover rail.

In addition, a bearing body for supporting the wind deflector in a central area may be mounted at the profiled part. Advantageously, the bearing body is slid into the profiled part while forming an interlocking shape connection with said profiled part. This bearing body may interact with a central shaft fastened at the cover rail.

Corresponding to a further modified embodiment of the invention, the wind deflector body consists of a sheet-metal strip and a plastic or rubber strip developed as a profiled part that is connected with it. In this case, the sheet-metal strip, advantageously, laterally juts out over the profiled plastic or rubber part, and the end pieces are placed on the protruding ends of the sheet-metal strip.

The end pieces may overlap the lateral edges of the profiled part in order to cover possible tolerance-caused gaps between the end pieces and the lateral edges of the profiled part.

In order to avoid rattling noises, the driving arrangement may advantageously have a driving pin that consists of a noise-muffling material. Instead or in addition, an actuating slot interacting with the driving pin may, at least in the area where the driving pins rest when the wind deflector is tilted out, be provided with a noise-muffling lining.

In the case of sliding roofs, means are provided as a rule that permit a vertical adjustment of the cover with respect to the fixed roof parts. In a further development of the invention, the cam interacting with the swivel arm is connected with a component that is not influenced by a vertical adjustment of the sliding cover and that may, for example, be a front guide shoe support. The result is that a vertical adjustment of the sliding cover has no influence on the actuation of the wind deflector.

These and further objects, features and advantages of the present invention will become more obvious from the following description when taken in connection with the accompanying drawings which show, for purposes of illustration only, plural embodiments in accordance with the present invention. CL BRIEF DESCRIPTION OF THE DRAWINGS FIG. 1 is a top view of a part of a motor vehicle roof having a sliding cover;

FIG. 7 is a partial view of the wind deflector body as well as of one of the end pieces from below;

FIG. 8 is a partial view of a cover rail provided as the support for the wind deflector body;

DETAILED DESCRIPTION OF THE PREFERRED EMBODIMENTS

Figure 2:
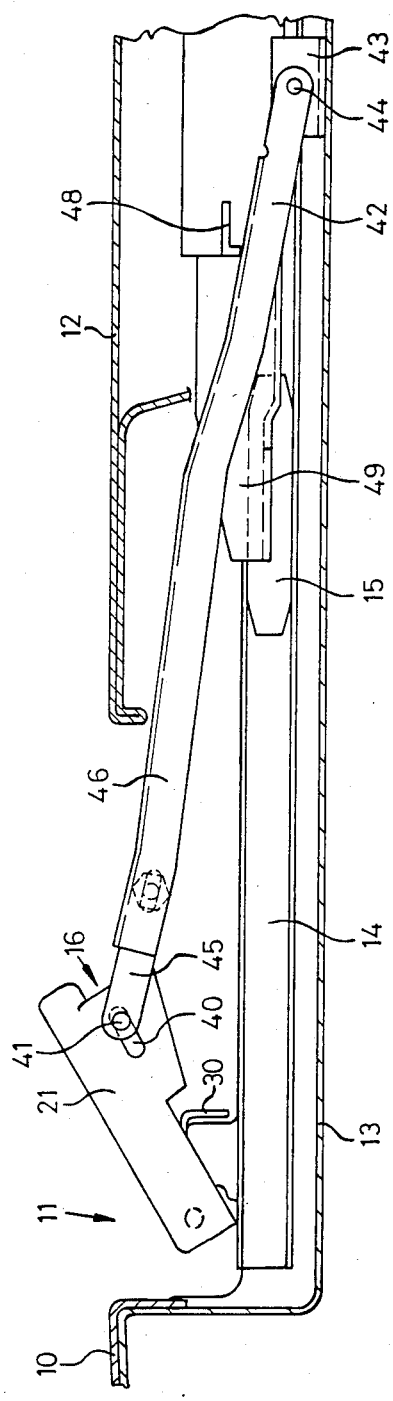
FIG. 2 is a section along Line II—II of FIG. 1.

An opening 11 is provided in the roof 10 of a motor vehicle. The opening 11 can be closed by a rigid sliding cover 12. The roof opening 11, in front and on the sides, is surrounded by a roof frame 13 that has lateral rails 14 extending in the longitudinal direction of the vehicle. The sliding cover 12 is guided in rails 14, in a known manner, via guide shoes of which only a front guide shoe 15 is shown in FIG. 2. In the front part of the roof frame 13, a wind deflector, designated generally by reference numeral 16, is disposed so that it can be swung around an axis extending transversely to the longitudinal axis of the vehicle.

In the case of the embodiment according to FIGS. 1, 2, 4 and 7, the wind deflector 16 is equipped with a wind deflector body 17 made of an extruded profiled light-metal part, in which a hollow space 18 exists for the purpose of weight reduction. A recess 19 is disposed on the bottom side of the deflector body 17, close to its front end. A projection 20 of an end piece 21 is slid into recess 19 at each end, producing an interlocking shape connection between the wind deflector body 17 and each end piece 21, as is shown best in FIG. 6.

Figure 3:
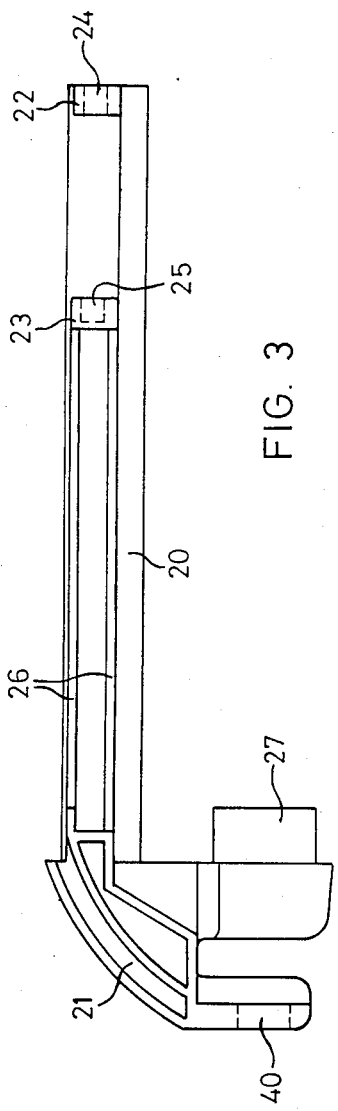
FIG. 3 is a view of one of the end pieces from below.
Figure 4:
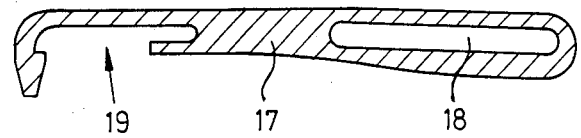
FIG. 4 is a cross section through an extruded light-metal part corresponding to one embodiment of the invention.

The end pieces 21, of which only one is shown in the figures, may advantageously be plastic parts, especially molded plastic parts. The end piece 21, at the inner end of its projection 20, provides two bearing points in the form of bearing lugs 22, 23 (FIG. 3). The bearing lug 22 has a through-opening 24, while the bearing opening 25 of the bearing point 23 is advantageously a pocket hole. Reinforcing ribs are indicated at 26. A shorter projection 27 of the end piece 21 extends into the hollow space 18 of the wind deflector body 17. As can be seen from FIGS. 1, 2 and 7, the end piece 21 covers the lateral edge of the wind deflector body 17 formed by the profiled part.

Figure 6:
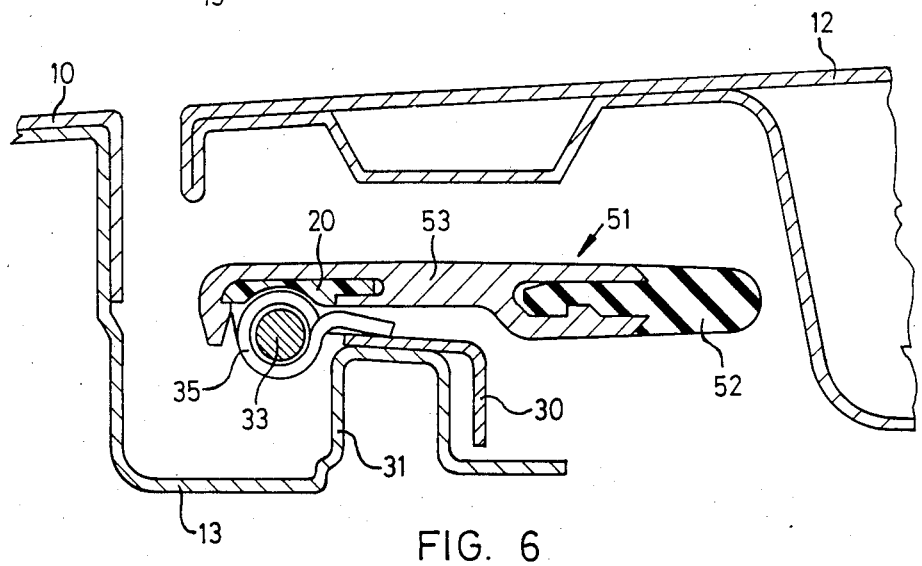
FIG. 6 is a section along Line VI—VI of FIG. 1.
Figure 9:
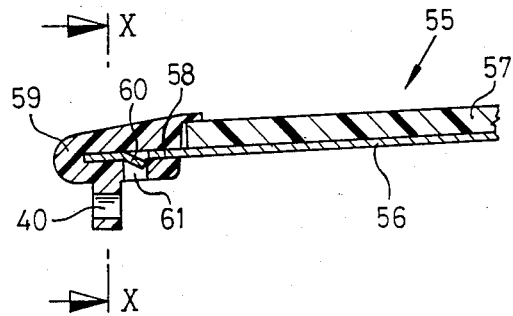
FIG. 9 is a partial longitudinal section corresponding to Line IX—IX of FIG. 11 for a modified embodiment of a wind deflector.
Figure 10:
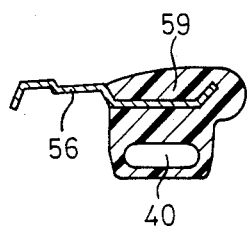
FIG. 10 is a section along Line X—X of FIG. 9.
Figure 11:
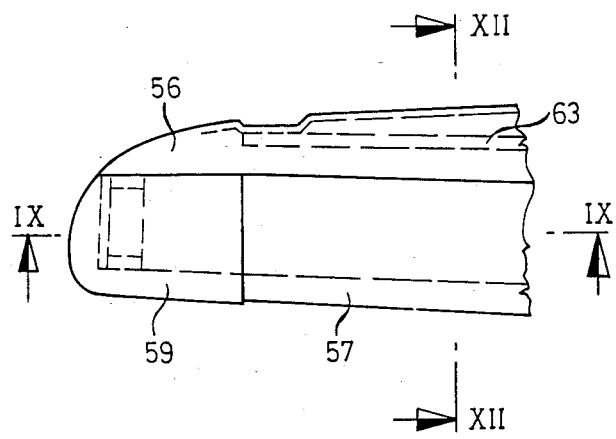
FIG. 11 is a top view of the wind deflector according to FIG. 9.

A cover rail 30 is provided as a support for the wind deflector 16 which is screwed onto an inverted U-shaped section 31 in the front part of the roof frame 13 by means of screws 32. Two offset hinge shafts 33 (only one of which is shown in the drawings) are fastened to the cover rail 30, by being welded on, for example. The free end 34 of the hinge shaft 33 is fitted into the bearing lugs 22, 23 of the end piece 21 and forms the axis about which the wind deflector 16 is swung. A torsion spring 35 is disposed between the bearing lugs 22, 23 on the free end 34 of the hinge shaft 33, said torsion spring 35 supporting itself, on the one side, at the wind deflector body 17 and/or the end piece 21 and, on the other side, at the cover rail 30 (FIG. 6). The torsion spring 35 has the purpose of tilting out the wind deflector 15, i.e., to bring it into the position shown in FIG. 2.

A center bearing 37 is also pushed into the recess 19 of the wind deflector body 17 and is held there by an interlocking shape connection. This center bearing 37 forms a bearing point 38 interacting with another hinge shaft 39. The hinge shaft 39 is offset on both ends (FIGS. 1 and 7) and by its bent ends is fastened, for example, welded to the cover rail 30. The bearing point 38 may advantageously be a bearing slot permitting a clipping of the center bearing 37 onto the hinge shaft 39.

Figure 1:
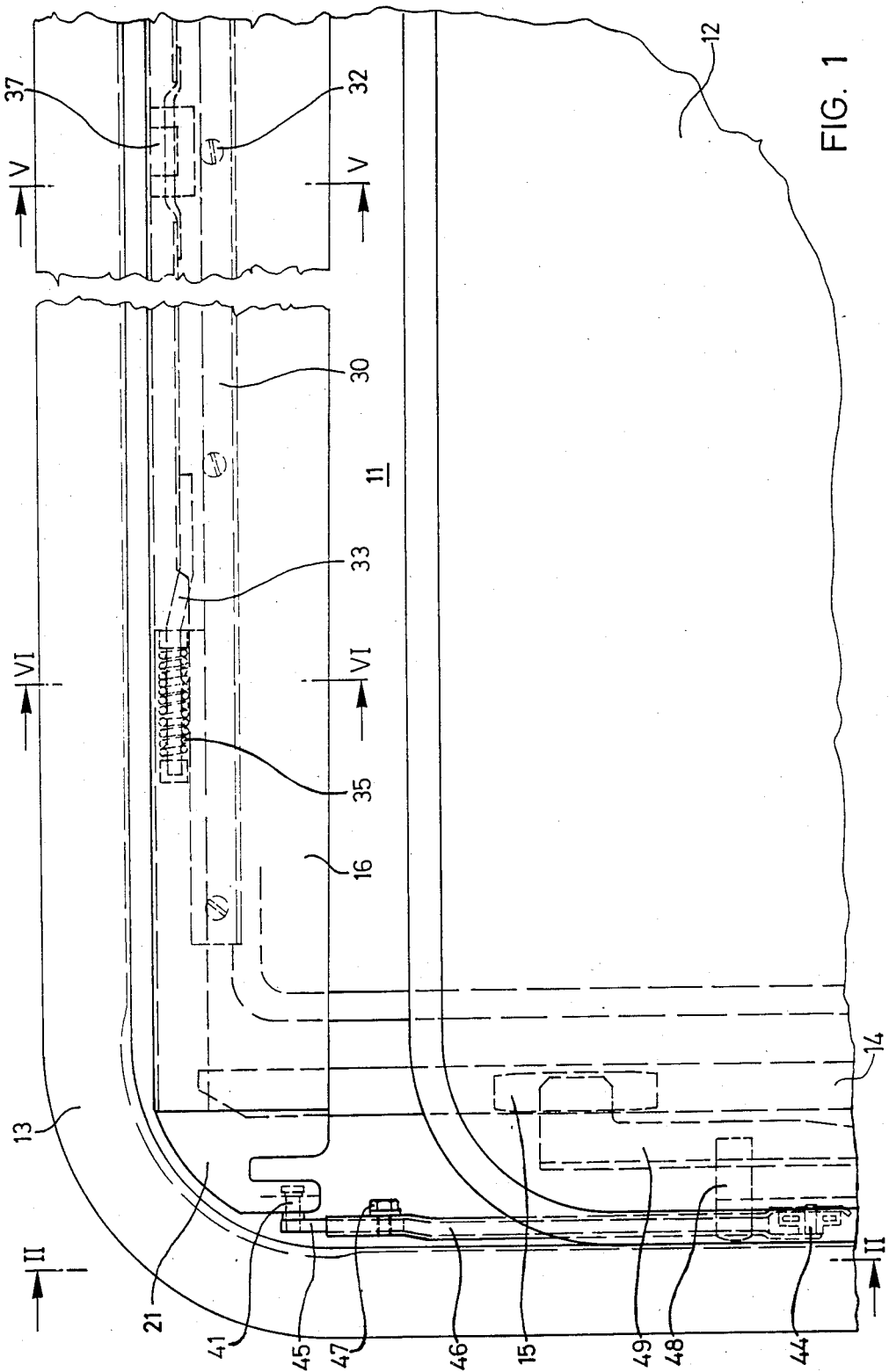

The end piece 21, at its outer end, is provided with an oblong actuating slot 40 into which a driving pin 41, at the front end of an actuating lever arm 42, engages (FIG. 2). At its other end, the lever arm 42 is connected with the roof frame 13 via a bearing block 43 and a pivot bearing 44. A front end piece 45 of the level arm 42 carries the driving pin 41 and is telescopically connected with a main part 46 of the lever arm. This makes it possible to adjust the effective distance between the pivot bearing 44 and the driving pin 41 and in this manner to adjust the tiltout height of the wind deflector. The end piece 45 and the main part 46 of the lever arm 42 can be fixed with respect to one another via an adjusting screw 47 (FIG. 1).

In order to avoid rattling noises, the driving pin 41 may consist of rubber or another noise-muffling material, and/or the actuating slot 40 may, at least in the area where the driving pin 41 rests when the wind deflector is tilted out, be provided with a resilient lining (not shown). In the case of this embodiment, the lining would be at the rear end portion of the actuating slot 40. Additionally, slot 40 advantageously has a length that makes it possible that, when the wind deflector 15 is tilted in, the driving pin 41 does not abut the front end of the slot.

When the sliding cover 12 is open (FIG. 2), the wind deflector 16 is tilted out under the influence of the torsion springs 35. When the sliding cover 12 is slid toward the front into its closed position, a cam 48 that is displaced as a function of the movement of the cover abuts each lever arm 42, causing it to swing around the bearing 44 in a counterclockwise direction. As a result, driving pin 41 moves toward the front in the actuating slot 40 so that the wind deflector 16 is swung down into the position shown in FIGS. 5 and 6.

The cam 48 is connected with the guide shoe support 49 or another component that participates in the sliding movement of the cover 12 and which, with respect to the rail 14, is retained at a fixed height. This ensures that the actuating of the wind deflector remains unaffected by a possible vertical adjustment of the sliding cover 12 with respect to the guide shoes which, as a rule, takes place by means that are not shown, in order to adjust the height of the cover so that it is positioned flush with the adjacent parts of the fixed roof 10.

Figure 5:
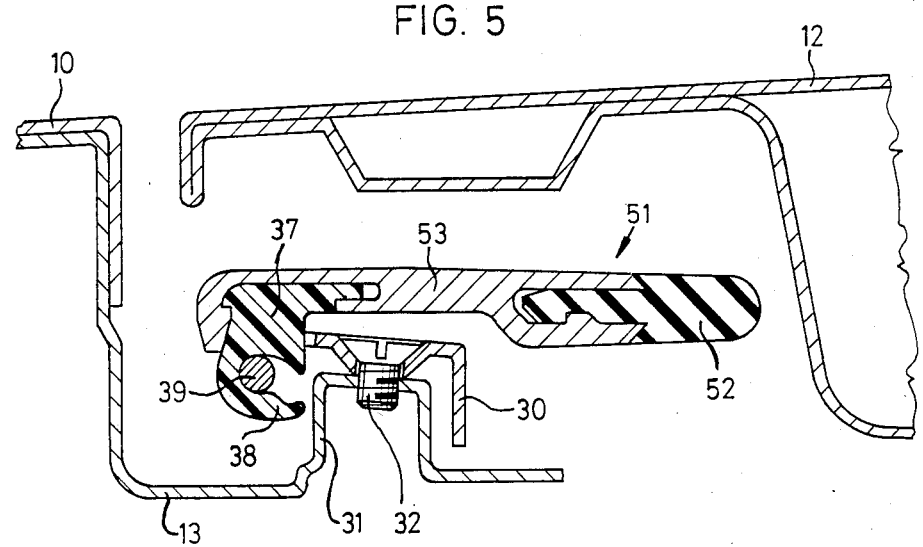
FIG. 5 is a section along Line V—V of FIG. 1 when a wind deflector body is used that is modified with respect to FIG. 4.

In the case of the embodiment according to FIGS. 5 and 6, the rear area of a modified wind deflector body, designated generally by reference numeral 51, is formed of a profiled part 52 made of rubber or plastic (which share the characteristics of resiliency and noise damping ability), while the front area of the wind deflector body 51 consists of an extruded light-metal profile 53. The two parts 52, 53 form an interlocking shape connection with one another and are dimensioned in such a way that they are flush with one another at the top and bottom surfaces.

Figure 12:
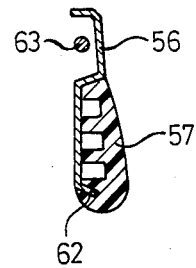
FIG. 12 is a section along Line XII—XII of FIG. 11.

In the case of another embodiment according to FIGS. 9 to 12, the wind deflector body 55 consists of a sheet-metal strip 56 and a profiled plastic or rubber strip 57 connected with it. The sheet-metal strip 56 juts out laterally relative to the profiled strip 57. End pieces 59, preferably again in the form of molded plastic parts, are fitted onto the protruding ends 58 of the sheet-metal strip 56. For securing pieces 59 and strips 56 together, a tongue 60 is developed in each end 58 which secures itself in a recess 61 in the end pieces 59 which may interact with the driving pin 41 in the same manner as the other embodiments. The profiled strip 57 may be fitted onto an upright tongue 62 of the sheet-metal strip 56 (FIG. 12). There also may be other type of mutual connections between parts 56, 57. Hinge shafts 63 are attached to the sheet-metal strip 56.

In the case of all previously explained embodiments, the surface of the wind deflector, if desired, can be powder-coated, flock-coated or may be provided with a coating in any other known way.

While we have shown and described plural embodiments in accordance with the present invention, it is understood that the same is not limited thereto, but is susceptible of numerous changes and modifications as known to those skilled in the art, and we, therefore, do not wish to be limited to cover all such changes and modifications as are encompassed by the scope of the appended claims.

We claim:

1. A wind deflector arrangement for a motor vehicle roof having a roof opening and a sliding cover for closing the roof opening comprising a wind deflector arranged along the front edge of the roof opening and mounted so as to pivot around an axis extending transversely to a longitudinal axis of the vehicle, and spring means for swinging said wind deflector out when the sliding cover is opened and cam means for swinging said wind deflector in when the sliding cover is closed, said cam means being displaceable as a function of the movement of the cover and interacting with at least one lever arm, said lever arm being connected with the wind deflector via a driving arrangement, wherein the wind deflector comprises a body formed at least partly of an as extruded, extruded profiled part side edges of which are covered by attachment to the body of a respective end piece which, at the same time, forms a part of the driving arrangement connecting the lever arm with the wind deflector.

2. A wind deflector according to claim 1, wherein the part of the driving arrangement formed by the end piece of the wind deflector is an actuating slot for receiving a driving pin of the driving arrangement.

3. A wind deflector arrangement according to claim 1, wherein the wind deflector body consists of an extruded light-metal profile.

4. A wind deflector arrangement according to claim 1, wherein the wind deflector body comprises an extruded profiled light-metal part and an additional component made of a material from the group consisting of plastics and rubbers, said component extending longitudinally with respect to the wind deflector.

5. A wind deflector according to claim 4, wherein the additional component is an elongated profiled strip part.

6. A wind deflector arrangement according to claim 1, wherein each end piece has a projection that projects laterally into a complementarily shaped recess of the profiled part of the wind deflector body.

7. A wind deflector arrangement according to claim 6, wherein the projections of the end pieces are provided with bearing means for stationary lateral hinge shafts around which the wind deflector can be swung.

8. A wind deflector arrangement according to claim 7, wherein, for fastening of the wind deflector body to the roof, a cover rail is provided that is mountable on a component that is fixed to the roof.

9. A wind deflector arrangement according to claim 8, wherein the hinge shafts are fastened to the cover rail.

10. A wind deflector arrangement according to claim 8, wherein said bearing means comprise two bearing points that are molded onto each of the end piece projections and are disposed at a distance from one another in an axial direction of the hinge shafts, and wherein, in each case, between the two bearing points, a torsion spring is fitted onto the hinge shafts which, on one side, engages against the wind deflector and, on the other side, engages against the cover rail.

11. A wind deflector arrangement according to claim 10, wherein the profiled part is also provided with a center bearing body for supporting a central area of the wind deflector.

12. A wind deflector arrangement according to claim 11, wherein the bearing body is slid into the profiled part in a manner producing an interlocking shape connection with said profiled part.

13. A wind deflector arrangement according to claim 12, wherein the bearing body interacts with a hinge shaft fastened to the cover rail.

14. A wind deflector arrangement according to claim 11, wherein the bearing body interacts with a hinge shaft fastened to the cover rail.

15. A wind deflector arrangement according to claim 1, wherein the wind deflector body comprises a sheet-metal strip and a profiled strip, of a material from the group consisting of plastics and rubbers, connected with the sheet-metal strip.

16. A wind deflector arrangement according to claim 15, wherein the sheet-metal strip protrudes laterally beyond the profiled strip, and end pieces are fitted onto the protruding ends of the sheet-metal strip.

17. A wind deflector arrangement according to claim 16, wherein the end pieces cover the side edges of the profiled part.

18. A wind deflector arrangement according to claim 10, wherein the driving arrangement has an actuating slot and a driving pin engaging in it, and wherein at least one of the driving pin and an area of the actuating slot where the driving pin rests when the wind deflector is tilted out is comprised of a noise-muffling material.

19. A wind deflector arrangement according to claim 1, wherein the driving arrangement has an actuating slot and a driving pin engaging in it, and wherein at least one of the driving pin and an area of the actuating slot where the driving pin rests when the wind deflector is tilted out is comprised of a noise-muffling material.

20. A wind deflector arrangement according to claim 1, wherein the cam interacting with the lever arm is connected with a component that is unaffected by a vertical adjustment of the height of the sliding cover.

21. A wind deflector according to claim 20, wherein the component connected with the cam is a support for guide shoe means by which said cover is slidably guided.

* * * * *